ns Patent Office
2,819,289
Patented Jan. 7, 1958

2,819,289

PURIFICATION OF HYDROCARBONS BY REFINING HYDROGENATION

Robert Lüben, Oberhausen, Germany, assignor to Ruhrchemie Aktiengesellschaft, Oberhausen-Holten, Germany, a corporation of Germany No Drawing. Application October 14, 1953
Serial No. 386,120

Claims priority, application Germany October 28, 1952

7 Claims. (Cl. 260—450)

This invention relates to improvements in the purification of hydrocarbons.

Hydrocarbons, which are produced by means of catalytic hydrogenation of carbon monoxide, and in particular the higher molecular weight hydrocarbons, having, for example, more than 17 carbon atoms, such as the slab paraffins and hard waxes, have in the raw state a yellow to dark brown color, an undesirable odor, and troublesome impurities. The purification of these hydrocarbons by a refining hydrogenation yields pure white odorless saturated products. These products, however, are not completely stable, and, if they are stored in the presence of light, warmth, and/or air, again assume an undesirable color, which results in a reduction of the value of the product.

One object of this invention is the purification of hydrocarbons which will yield a pure white highly color-stable product. This, and still further objects, will become apparent from the following description:

It has been found in accordance with the invention that highly color-stable refined products are obtained if the hydrocarbons are subjected to a refining hydrogenation, using a hydrogenation catalyst which contains both metallic nickel and metallic copper.

The raw, impure hydrocarbons which may be treated in accordance with the invention are preferably those containing more than 17 carbon atoms in the molecule. These hydrocarbons may be of synthetic or natural sources. It is possible by means of the process according to the invention to process hydrocarbons which, for example, have been isolated from petroleum, brown coal tar oil or shale oil. Among the synthetic hydrocarbons those produced by way of the catalytic carbon monoxide hydrogenation are most suitable for the processing. The catalytic carbon monoxide hydrogenation may be effected with the conventional catalysts by the fixed-bed or "fluidized" process.

The hydrogenation is effected at temperatures of 200° to 260° C. and preferably at 250° C. using either pure hydrogen or mixtures of hydrogen and nitrogen. It is of advantage to use a gas mixture which contains 25 parts by volume of nitrogen for every 75 parts by volume of hydrogen. The gases and gas mixtures used for the hydrogenation must be commercially free from carbon monoxide. The hydrogenation may be effected at any pressure, the partial pressure of the hydrogen present in the hydrogenation gas being essential. A hydrogenation occurs at a pressure of as low as atomspheric pressure but it takes a long time. In practice, the process is best operated with hydrogen partial pressures of 35–100 kilos/sq. cm.

The catalysts used may contain nickel and copper in any quantitative proportion. Commercially usable are in particular such catalysts which contain 40 to 60% of copper and 60 to 40% of nickel. It is preferable, as mentioned above, to use catalysts which contain equal quantities of copper and nickel. Moreover, the catalysts contain an addition of magnesia which amounts to 15 to 30 parts by weight of MgO and preferably to 20 parts by weight of MgO for every 100 parts by weight of nickel and every 100 parts by weight of copper. Besides, 100 to 250 parts by weight and preferably 200 parts by weight of kieselguhr are added to the catalyst for every 100 parts by weight of nickel and every 100 parts by weight of copper.

The catalysts are prepared by precipitation and reduced after drying. The reduction is carried on so far as to have 70 to 100% and preferably 80% of the metals contained in the catalyst mass present in the active reduced form.

With the use of such catalysts in accordance with the invention, it is possible, for example, to convert raw, brown, hard wax of the Fischer-Tropsch synthesis into a colorless product within forty minutes. The time required for the refining hydrogenation in accordance with the invention is thus materially less than that conventionally required. In addition, the refined product produced is highly color-stable, and, for example, will not darken either upon being stored for six months in the presence of air and light, or upon being maintained in the melted state for more than forty-eight hours.

As contrasted to this, when effecting the same refining hydrogenation using catalysts which contain only nickel metal 110 minutes are required to achieve the same degree of color purification, while the end products obtained are far less color-stable.

Based on a given space-time yield of products of stable color, catalysts containing equal parts of nickel and copper in accordance with the invention had a 170% greater efficiency than the efficiency of the conventional nickel-magnesia-kieselguhr catalysts.

A further advantage obtained in accordance with the invention with the use of the nickel and copper-containing catalyst consists in that a hydrogen partial pressure of as low as about 10 kg. per sq. cm. with a treating time of about two hours is sufficient for the refining hydrogenation of raw paraffin from catalytic carbon monoxide hydrogenation in order to obtain a fully refined finished product of stable color. The same results could not possibly be obtained using the nickel and magnesia-containing catalysts heretofore conventionally used for refining of paraffin.

A catalyst excellently suited for the refining hydrogenation in accordance with the invention, consists of, for example, 100 parts by weight of metallic nickel, 100 parts by weight of metallic copper, 20 parts by weight of magnesia, and 200 parts by weight of kieselguhr. This catalyst may be easily prepared in the conventional manner by precipitation with soda from the nitrates or chlorides of the metals, stirring in kieselguhr and subsequent reduction. Similar to all catalysts which are activated with magnesium oxide, it is also advisable for the increase in activity and prolongation of the catalyst life to pre-treat the hydrocarbons or hydrocarbon mixtures to be processed with magnesium oxide. A preferable method of preparing the catalyst is as follows: 4 liters of an aqueous solution which contains 100 grams of copper, 100 grams of nickel and 20 grams of magnesia in the form of their nitrates are heated to boiling. By admixing a hot soda solution, the nitrates are precipitated in the form of hydroxides and carbonates. To the mixture thus obtained by precipitation, there are added 200 grams of kieselguhr which has a loose weight of 90 grams/liter and had been roasted at 600° to 700° C. After mixing for a sufficiently long time, the solid constituents are separated by filtration from the solution and washed with hot water. The mass filtered off is molded in the conventional manner as required for the fixed-bed or "fluidized" process. Thereafter, the catalyst is reduced for 12 hours at about 105° C. and atmospheric pressure using a hydrogen-nitrogen mixture consisting of 75 parts by volume of hydrogen and 25 parts by volume of nitrogen.

In accordance with the invention the catalyst may be used in stationary beds or suspended in liquid or melted products.

The following examples are given by way of illustration and not limitation:

*Example 1*

A raw hard wax from the Fischer-Tropsch synthesis boiling above 380° C. was completely hydrogenated in a continuously operating hydrogenation column with a stationary catalyst at 250° C. and at a hydrogen partial pressure of 75 kg. per sq. cm., using, on the one hand, a nickel-magnesia-kieselguhr catalyst (100 parts by weight of nickel, 15 parts by weight of magnesia, and 50 parts by weight of kieselguhr), and, on the other hand, a nickel-copper-magnesia-kieselguhr catalyst (100 parts by weight of nickel metal, 100 parts by weight of copper metal, 20 parts by weight of magnesia, and 200 parts by weight of kieselguhr). To obtain a refined product of stable color the residence time required in the reaction space was 110 minutes for the first case and about 40 minutes for the second case.

*Example 2*

A raw, hard wax boiling above 380° C. and obtained by the catalytic hydrogenation of carbon monoxide and having a deep brown color was hydrogenated in continuous operation, using, on the one hand, a nickel- and magnesia-containing catalyst, and, on the other hand, by the process in accordance with the invention using a catalyst which contained metallic nickel and metallic copper. The composition of the catalysts was as mentioned in Example 1. The hydrogen partial pressure in the hydrogenation was maintained at 18 kg. per sq. cm.

After a hydrogenation time of 360 minutes, a finished product which had still a yellow color was obtained with the nickel- and magnesia-containing catalyst. The nickel- and copper-containing catalyst yielded after 90 minutes a fully hydrogenated pure white finished product of stable color.

As may be seen, it is not only possible with the nickel- and copper-containing catalyst to complete the hydrogenation in a very short time, but also to obtain a considerably better finished product than with the nickel- and magnesia-containing catalyst hitherto used.

*Example 3*

1000 grams of a black-brown carbon monoxide hydrogenation product boiling above 340° C. and prepared by means of an iron catalyst which was suspended in the form of dust in the synthesis gas, were mixed with 4000 cc. of a saturated $C_7$ fraction from carbon monoxide hydrogenation. To this mixture, there were added 100 gms. of a copper-nickel catalyst which contained equal quantities of copper and nickel in addition to the amounts stated above of magnesia and kieselguhr. The hydrogenation was effected for 3 hours at 250° C. using a hydrogen partial pressure of 30 kg. per sq. cm. After the separation of the catalyst the reaction mixture was cooled to 20° C. and filtered. The filtered mass was washed with heptane. A colorless paraffin of stable color was obtained as the end product.

*Example 4*

1000 grams of a petroleum paraffin of a yellowish-brown color were mixed with 50 gms. of the catalyst used in the preceding examples. The hydrogenation was effected at 250° C. using a hydrogen partial pressure of 75 kg. per sq. cm. The total gas pressure was 100 kg. per sq. cm. since the gas used for the hydrogenation contained 25% by volume of nitrogen in addition to the hydrogen. The hydrogenation was terminated after 3 hours. Thereafter, the catalyst was separated by filtration. There was obtained a colorless end product from which by extractive deoiling a paraffin of stable color could be produced. The iodine number, neutralization number and saponification number of this paraffin were 0.

*Example 5*

1000 grams of a paraffin obtained from a crude shale oil produced by retorting of oil shale were mixed with 50 grams of the catalyst mentioned in the preceding examples and hydrogenated for 2 hours at 250° C. and a hydrogen partial pressure of 50 kg. per sq. cm. After the separation of the catalyst and deoiling of the product, a colorless paraffin of stable color was obtained as the end product.

I claim:

1. In the process for the purification of raw hydrocarbons having more than 17 carbon atoms such as paraffin hydrocarbons from the catalytic hydrogenation of carbon monoxide by a refining hydrogenation, the improvement which comprises contacting such a raw hydrocarbon with hydrogen in the presence of a hydrogenation catalyst containing metallic nickel and metallic copper and 15–30 parts by weight of magnesium oxide per 200 parts by weight of nickel and copper combined and recovering a stable, color-purified hydrocarbon.

2. Improvement according to claim 1, in which said hydrogenation catalyst contains about 1 parts by weight of metallic copper per part by weight of metallic nickel.

3. Improvement according to claim 1, in which said contacting is effected with a hydrogen partial pressure not in excess of 18 kg. per sq. cm.

4. Process according to claim 1, in which said raw hydrocarbon is a slab paraffin.

5. Process according to claim 1, in which said raw paraffin is a hard wax.

6. Process according to claim 1, in which said hydrogenation catalyst contains 20 parts by weight of magnesium oxide per 200 parts by weight of nickel and copper combined.

7. Improvement according to claim 1, in which said catalyst contains 100 parts by weight of nickel, 100 parts by weight of copper, 20 parts by weight of magnesium oxide, and 200 parts by weight of kieselguhr.

References Cited in the file of this patent

UNITED STATES PATENTS

| | | |
|---|---|---|
| 1,268,692 | Dewar et al. | June 4, 1918 |
| 2,365,751 | Drennan | Dec. 26, 1944 |
| 2,651,655 | Loughran et al. | Sept. 8, 1953 |